United States Patent
Ha et al.

(10) Patent No.: US 9,269,177 B2
(45) Date of Patent: Feb. 23, 2016

(54) METHOD FOR PROCESSING IMAGE AND APPARATUS FOR PROCESSING IMAGE

(75) Inventors: Raejoo Ha, Seoul (KR); Hyojoon Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

(21) Appl. No.: 14/123,955

(22) PCT Filed: Aug. 18, 2011

(86) PCT No.: PCT/KR2011/006078
§ 371 (c)(1),
(2), (4) Date: Dec. 4, 2013

(87) PCT Pub. No.: WO2012/169693
PCT Pub. Date: Dec. 13, 2012

(65) Prior Publication Data
US 2014/0118344 A1    May 1, 2014

(30) Foreign Application Priority Data
Jun. 10, 2011   (KR) .................... 10-2011-0056459

(51) Int. Cl.
*G06T 15/00*   (2011.01)
*H04N 13/02*   (2006.01)
*H04N 13/04*   (2006.01)

(52) U.S. Cl.
CPC ............ *G06T 15/00* (2013.01); *H04N 13/0275* (2013.01); *H04N 13/0278* (2013.01); *H04N 13/0468* (2013.01); *H04N 13/0484* (2013.01)

(58) Field of Classification Search
CPC .......... H04N 13/0275; H04N 13/0278; H04N 13/0484; H04N 13/0468; G06T 15/00
USPC .............. 345/419, 420, 422; 382/154; 348/51
See application file for complete search history.

(56) References Cited

U.S. PATENT DOCUMENTS

| | | | | |
|---|---|---|---|---|
| 5,850,352 A * | 12/1998 | Moezzi et al. | ................ | 345/419 |
| 6,996,267 B2 * | 2/2006 | Tabata | .......... | 382/154 |
| 8,411,931 B2 * | 4/2013 | Zhou et al. | .................... | 382/154 |
| 8,698,797 B2 * | 4/2014 | Chen et al. | ..................... | 345/419 |
| 8,717,423 B2 * | 5/2014 | Vesely et al. | .................... | 348/51 |
| 8,878,842 B2 * | 11/2014 | Kim et al. | ..................... | 345/419 |
| 8,928,654 B2 * | 1/2015 | Givon | .......... | 345/419 |
| 9,001,157 B2 * | 4/2015 | Gateau | ......... | 345/653 |

FOREIGN PATENT DOCUMENTS

| | | |
|---|---|---|
| JP | 2010-020487 | 1/2010 |
| KR | 10-2001-0001341 | 1/2001 |
| KR | 10-2011-0020411 | 3/2011 |

OTHER PUBLICATIONS

PCT International Application No. PCT/KR2011/006078, Written Opinion of the International Searching Authority dated May 1, 2012, 25 pages.

* cited by examiner

*Primary Examiner* — Phu K Nguyen
(74) *Attorney, Agent, or Firm* — Lee, Hong, Degerman, Kang & Waimey

(57) ABSTRACT

A method for processing an image, according to an embodiment of the present invention, comprises the following steps: receiving three-dimensional image data from an application; setting a left eye perspective, which corresponds to the left eye of a user, and setting a right eye perspective, which corresponds to the right eye of the user; and generating a binocular disparity image comprising a left eye perspective image and a right eye perspective image, according to the left eye perspective and the right eye perspective.

13 Claims, 14 Drawing Sheets

$$\begin{pmatrix} \frac{2n}{r-l} & 0 & \frac{r+l}{r-l} & 0 \\ 0 & \frac{2n}{t-b} & \frac{t+b}{t-b} & 0 \\ 0 & 0 & \frac{-(f+n)}{f-n} & \frac{-2fn}{f-n} \\ 0 & 0 & -1 & 0 \end{pmatrix}$$

METHOD FOR PROCESSING IMAGE AND APPARATUS FOR PROCESSING IMAGE

CROSS-REFERENCE TO RELATED APPLICATIONS

This application is the National Stage filing under 35 U.S.C 371 of International Application No. PCT/KR2011/006078, filed on Aug. 18, 2011, which claims the benefit of earlier filing date and right of priority to Korean Patent Application No. 10-0056459, filed on Jun. 10, 2011, the contents of which are all hereby incorporated by reference herein in their entirety.

FIELD OF THE INVENTION

The present invention relates to a method for processing an image and an apparatus for processing an image and, more particularly, to a method for processing and image and an apparatus for processing image for displaying a stereoscopic image (or holographic image) or a binocular parallax (or binocular disparity) image.

BACKGROUND ART

By using three-dimensional (3D) graphics, a display device displaying two-dimensional (2D) images may also display 3D models more realistically. However, even when displaying 3D models by using 3D graphics, since the display device that can be verified by the user corresponds to a 2D display screen, a procedure for converting the 3D model to a 2D display screen viewed from the user's (or viewer's) perspective is required.

Since a 2D image that is generally being converted is configured of a left-view image (or left eye perspective image) and a right-view image (or right eye perspective image) that are identical to one another, the stereoscopic effect (or volumetric effect) caused by the binocular parallax cannot be recognized in the stereoscopic display using the binocular parallax.

In order to provide a stereoscopic image having a binocular parallax through the stereoscopic display, a left-eye image and a right-eye image should be generated by an application. Additionally, in case the application does not have such function, the correction is required to be made in the corresponding application so that a binocular parallax image can be provided.

Meanwhile, a method for providing the effects of stereoscopic images in an image display device, which does not provide any stereoscopic images, by determining the eye position of the user's has recently been proposed. However, such a method is inconvenient in that a function of picturing an image with respect to the user's eye position should be realized in the application one by one.

DETAILED DESCRIPTION OF THE INVENTION

Technical Objects

In order to resolve the above-described technical problem of the present invention, an object of the present invention is to provide a method for processing an image and an apparatus for processing an image that can provide a binocular parallax image by using three-dimensional (3D) image data.

Additionally, another object of the present invention is to provide a method for processing an image and an apparatus for processing an image that can provide an image corresponding to the user's view (or perspective) by using 3D image data.

Technical Solutions

In order to achieve the above-described technical object of the exemplary embodiment of the present invention, an image processing method includes the steps of receiving three-dimensional (3D) image data from an application, setting-up a left-eye view corresponding to a user's left eye and a right eye view corresponding to the user's right eye, and generating a binocular parallax image, the binocular parallax image including a left-eye view image and a right-eye view image respective to the left-eye view and the right-eye view.

The step of generating a binocular parallax image may include the steps of generating left-eye view image data by modifying the 3D image data based upon the left-eye view, generating the left-eye view image by rendering the left-eye view image data, generating right-eye view image data by modifying the 3D image data based upon the right-eye view, generating the right-eye view image by rendering the right-eye view image data, and generating a binocular parallax image by combining the left-eye view image and the right-eye view image.

The 3D image data may correspond to openGL based data.

The left-eye view and the right-eye view may be set-up in accordance with characteristics of an image display device displaying the binocular parallax image. And, the characteristics may include a screen size of the image display device.

Meanwhile, an image processing device according to an exemplary embodiment of the present invention includes a parallax image generating module receiving three-dimensional (3D) image data from an application, generating a left-eye view corresponding to a user's left eye and a right eye view corresponding to the user's right eye, generating left-eye view image data by modifying the 3D image data based upon the left-eye view, and generating right-eye view image data by modifying the 3D image data based upon the right-eye view, a rendering engine generating a left-eye view image by rendering the left-eye view image data, and generating a right-eye view image by rendering the right-eye view image data, and a driver generating a binocular parallax image by combining the left-eye view image and the right-eye view image.

The image processing device may further include a left-eye frame buffer storing the left-eye view image generated by the rendering engine and outputting the stored image to the driver, and a right-eye frame buffer storing the right-eye view image generated by the rendering engine and outputting the stored image to the driver.

Meanwhile, an image processing method according to an exemplary embodiment of the present invention includes the steps of receiving three-dimensional (3D) image data from an application, determining a user's position, generating a view respective to the user's position, and generating a user position based image by modifying the 3D image data respective to the generated view.

At this point, in the step of determining a user's position, position information of the user may be detected from any one of an output of an image sensor and an output of an optical sensor, the optical sensor detecting light rays of a specific wave.

Additionally, in the step of determining a user's position, position information of the user may be detected by calculating 3D position information of the user's face from any one of an output of an image sensor and an output of an optical sensor.

Additionally, the step of generating a user position based image may include generating user position based image data by modifying the 3D image data based upon the generated view, and generating the user position based image by rendering the user position based image data.

Meanwhile, according to another exemplary embodiment of the present invention, an image processing device includes a user position detecting module determining a user's position, a parallax image generating module receiving three-dimensional (3D) image data from an application, generating view respective to the user's position detected from the user position detecting module, and generating user position based image data by modifying the 3D image data respective to the generated view, and a rendering engine generating a user position based image by rendering the user position based image data generated from the parallax image generating module.

At this point, the user position detecting module may include at least one of an image sensor and an optical sensor, the optical sensor detecting light rays of a specific wave.

Effects of the Invention

According to the present invention, a binocular parallax image may be provided by using 3D image data being provided from an application. At this point, even in case the application does not provide a binocular parallax image, the user may be capable of selectively viewing (or enjoying) a stereoscopic image (or 3D image) having a sense of depth.

Additionally, since the left-eye view and the right-eye view may be set up (or determined) based upon the characteristic of the device, such as the screen size of the display panel, a maximum allowable (or permissible) parallax, and so on, a binocular parallax image optimized for the image display device may be provided.

Furthermore, according to the present invention, by detecting the user's perspective (or view or viewpoint) in real-time, a user position based image corresponding to the real-time detected user perspective (or view) may be outputted. Accordingly, the user may view (or enjoy) an image having a stereoscopic (or 3D) effect even from a 2D image display device, which does not provide any stereoscopic images (or 3D images).

BEST MODE FOR CARRYING OUT THE PRESENT INVENTION

Figure 1:
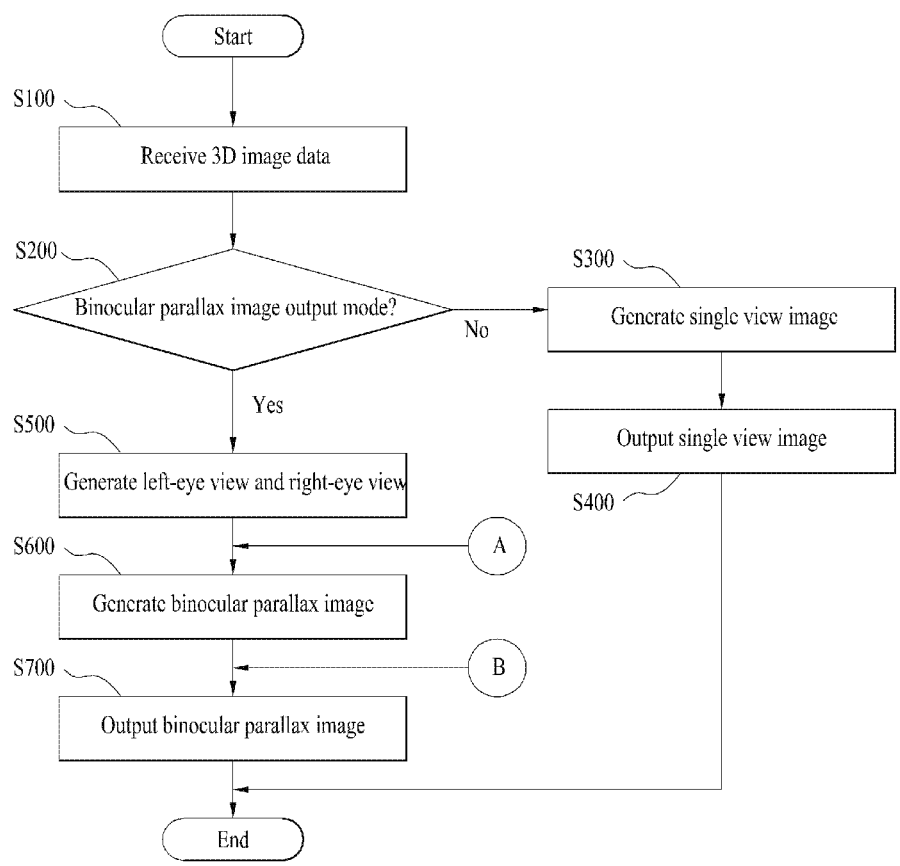
FIG. 1 illustrates a flow chart showing a method of displaying an image according to a first exemplary embodiment of the present invention.

In order to achieve the above-described technical object of the exemplary embodiment of the present invention, an image processing method includes the steps of receiving three-dimensional (3D) image data from an application, setting-up a left-eye view corresponding to a user's left eye and a right eye view corresponding to the user's right eye, and generating a binocular parallax image, the binocular parallax image including a left-eye view image and a right-eye view image respective to the left-eye view and the right-eye view.

The step of generating a binocular parallax image may include the steps of generating left-eye view image data by modifying the 3D image data based upon the left-eye view, generating the left-eye view image by rendering the left-eye view image data, generating right-eye view image data by modifying the 3D image data based upon the right-eye view, generating the right-eye view image by rendering the right-eye view image data, and generating a binocular parallax image by combining the left-eye view image and the right-eye view image.

The 3D image data may correspond to openGL based data.

The left-eye view and the right-eye view may be set-up in accordance with characteristics of an image display device displaying the binocular parallax image. And, the characteristics may include a screen size of the image display device.

Meanwhile, an image processing device according to an exemplary embodiment of the present invention includes a parallax image generating module receiving three-dimensional (3D) image data from an application, generating a left-eye view corresponding to a user's left eye and a right eye view corresponding to the user's right eye, generating left-eye view image data by modifying the 3D image data based upon the left-eye view, and generating right-eye view image data by modifying the 3D image data based upon the right-eye view, a rendering engine generating a left-eye view image by rendering the left-eye view image data, and generating a right-eye view image by rendering the right-eye view image data, and a driver generating a binocular parallax image by combining the left-eye view image and the right-eye view image.

The image processing device may further include a left-eye frame buffer storing the left-eye view image generated by the rendering engine and outputting the stored image to the driver, and a right-eye frame buffer storing the right-eye view image generated by the rendering engine and outputting the stored image to the driver.

Meanwhile, an image processing method according to an exemplary embodiment of the present invention includes the steps of receiving three-dimensional (3D) image data from an application, determining a user's position, generating a view respective to the user's position, and generating a user position based image by modifying the 3D image data respective to the generated view.

At this point, in the step of determining a user's position, position information of the user may be detected from any one of an output of an image sensor and an output of an optical sensor, the optical sensor detecting light rays of a specific wave.

Additionally, in the step of determining a user's position, position information of the user may be detected by calculating 3D position information of the user's face from any one of an output of an image sensor and an output of an optical sensor.

Additionally, the step of generating a user position based image may include generating user position based image data by modifying the 3D image data based upon the generated view, and generating the user position based image by rendering the user position based image data.

Meanwhile, according to another exemplary embodiment of the present invention, an image processing device includes a user position detecting module determining a user's position, a parallax image generating module receiving three-dimensional (3D) image data from an application, generating view respective to the user's position detected from the user position detecting module, and generating user position based image data by modifying the 3D image data respective to the generated view, and a rendering engine generating a user position based image by rendering the user position based image data generated from the parallax image generating module.

At this point, the user position detecting module may include at least one of an image sensor and an optical sensor, the optical sensor detecting light rays of a specific wave.

Mode for Carrying Out the Present Invention

Hereinafter, the exemplary embodiments of the present invention will be described in detail with reference to the accompanying drawings. First of all, a first exemplary embodiment of the present invention will be described in detail with reference to FIG. 1 to FIG. 7. This exemplary embodiment of the present invention provides a method for generating and displaying a binocular parallax image based upon 3D image data.

FIG. 1 illustrates a flow chart showing a method of displaying an image including a method of processing an image according to a first exemplary embodiment of the present invention. As shown in FIG. 1, in the method for displaying an image according to the first exemplary embodiment of the present invention, first of all, 3D image data being provided from an application are received (S100). At this point, the application providing the 3D image data, which include coordinate information within a 3D space, may correspond to a game application based upon an openGL (Open Graphics Library). However, the present invention will not be limited only to this, and, therefore, the present invention may be applied to diverse applications providing 3D image data.

Subsequently, it is determined whether or not the 3D image data, which are outputted from the application, are to be converted to a binocular parallax image (S200). At this point, in case the image output mode corresponds to a general 2D image output mode instead of the binocular parallax image, an image respect to a single view is generated (S300), and the image being generated with respect to the single view is outputted (S400).

Meanwhile, in case the image output mode corresponds to a binocular parallax image output mode, a left-eye view corresponding to the left eye and a right-eye view corresponding to the right eye of the user (16) are set up (or determined) (S500).

Figures 2, 3:
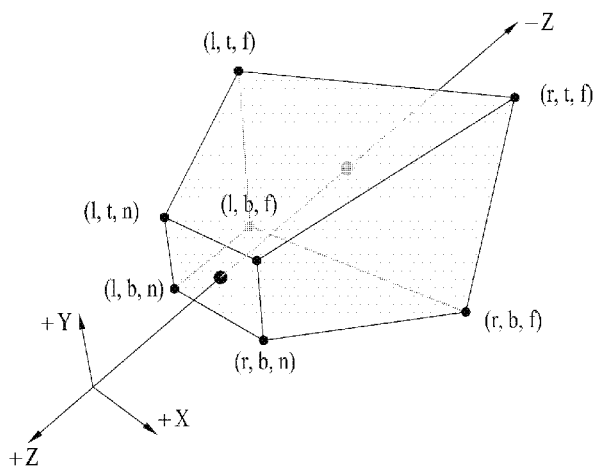
FIG. 2 illustrates a general view showing an exemplary coordinate space for displaying 3D image data.
FIG. 3 illustrates an exemplary projection matrix for converting 3D image data to two-dimensional (2D) image data, the 3D image data being displayed on the coordinate space of FIG. 2.

FIG. 2 illustrates a general view showing an exemplary coordinate space for displaying 3D image data, and FIG. 3 illustrates an exemplary projection matrix for converting 3D image data displayed on the coordinate space of FIG. 2 to data that are to be displayed on a 2D screen. As shown in FIG. 2, r represents a right-side boundary with respect to the x-axis within the coordinate space, l represents a left-side boundary with respect to the x-axis within the coordinate space, b represents a lower-side boundary with respect to the y-axis within the coordinate space, t represents an upper-side boundary with respect to the y-axis within the coordinate space, n represents a boundary of a side closer to the z-axis within the coordinate space, f represents a boundary of a side further away from the z-axis within the coordinate space. At this point, each of r, t, n has a positive value, and each of l, b, f has a negative value respectively having the same absolute values as r, t, n.

As r and l values of the basic projection matrix of FIG. 3 are equally decreased or increased, the left-eye view and the right-eye view may be set up. At this point, in the exemplary space shown in FIG. 2, the left-eye view and the right-eye view may be set up based upon the characteristics, such as the positions of the objects, the width of a far plain, the size of the display screen, and measurement values of the maximum allowable parallax.

For example, in case multiple objects are concentrated in a limited space, the user (16) may have difficulty in experiencing the sense of depth. Therefore, by scaling a distance between the left-eye view and the right-eye view with respect to the position of the corresponding object, the sense of depth may be optimized.

At this point, as an average position of the objects are located closer to the far plain along the z axis, it is preferable that the distance between the left-eye view and the right-eye view are increased at a constant rate.

Additionally, since the parallax has the greatest value in the far plain, the distance between the left-eye view and the right-eye view may be adjusted so that the maximum allowable parallax can be gained herein.

Furthermore, when performing a rendering process on a final screen, since the far plain is scaled to best fit the screen size of a display panel (160), by calculating a ratio between the width of the far plain and the screen size, the distance between the left-eye view and the right-eye view may be adjusted so that a final shift value can be within the range of the maximum allowable parallax. At this point, the maximum allowable parallax corresponds to a value that is calculated by assuming a predetermined distance from the image display device (100), wherein the maximum allowable parallax value may be decided in pixel units.

Figure 4:
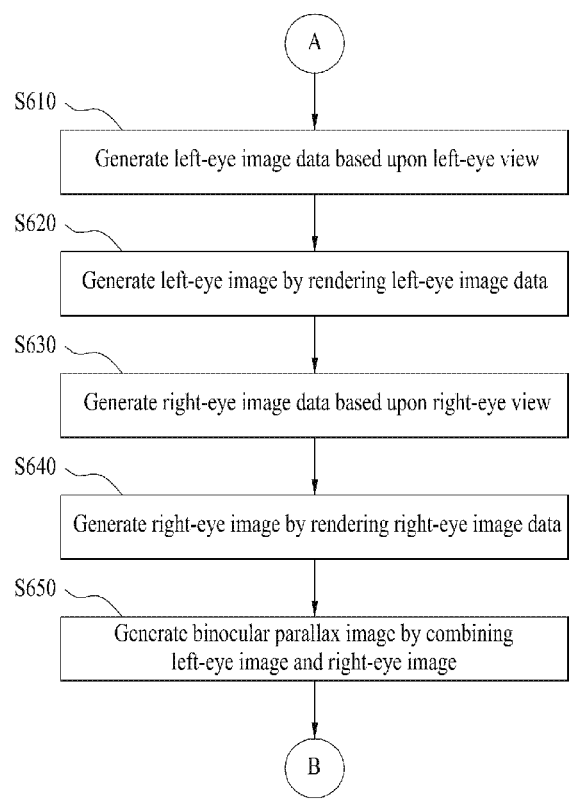
FIG. 4 illustrates a flow chart showing the step of generating a binocular parallax image of FIG. 1 in more detail.

Thereafter, a binocular parallax image including a left-eye view image and a right-eye view image respective to the left eye and the right eye is generated (S600). FIG. 4 illustrates a flow chart showing the step of generating a binocular parallax image of FIG. 1 in more detail. A method for generating a binocular parallax image will hereinafter be described in detail with reference to FIG. 4.

First of all, the 3D image data are modified based upon the left-eye view, so as to generate left-eye view image data (S610), and, then, the left-eye view image data are rendered, so as to generate a left-eye view image (S620).

Figure 5:
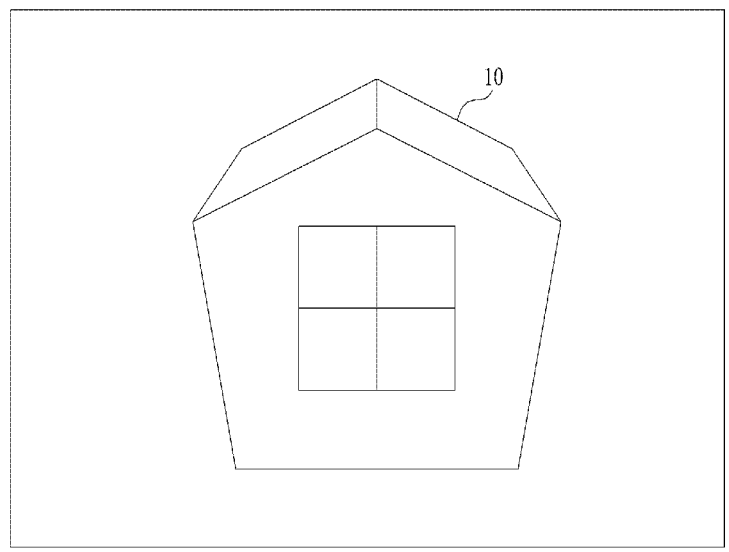
FIG. 5 illustrates a general view of an exemplary 3D image.
Figure 6:
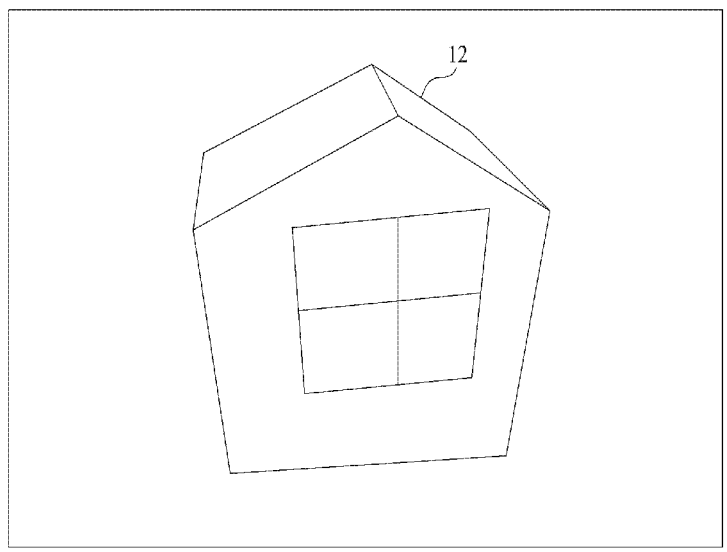
FIG. 6 illustrates a general view of an exemplary left-eye view image.

For example, in accordance with the set up value of the left-eye view, r and l values within the basic projection matrix of FIG. 3 are equally decreased, so as to obtain a left-eye view projection matrix for generating left-eye view data. By using the left-eye view projection matrix, which is generated as described above, the 3D image data may be converted to the left-eye view image data. FIG. 5 illustrates a general view of an exemplary 3D image (10), which is displayed by a basic projection matrix, and FIG. 6 illustrates a general view of an exemplary left-eye view image (12), which is generated in accordance with the left-eye view image data being converted by the left-eye view projection matrix. As shown in FIG. 6, an asymmetric image corresponding to the left-eye view of the user (16) may be generated by the left-eye view projection matrix.

Subsequently, the 3D image data are modified based upon the right-eye view, so as to generate right-eye view image data (S630), and, then, the right-eye view image data are rendered, so as to generate a right-eye view image (S640).

Figure 7:
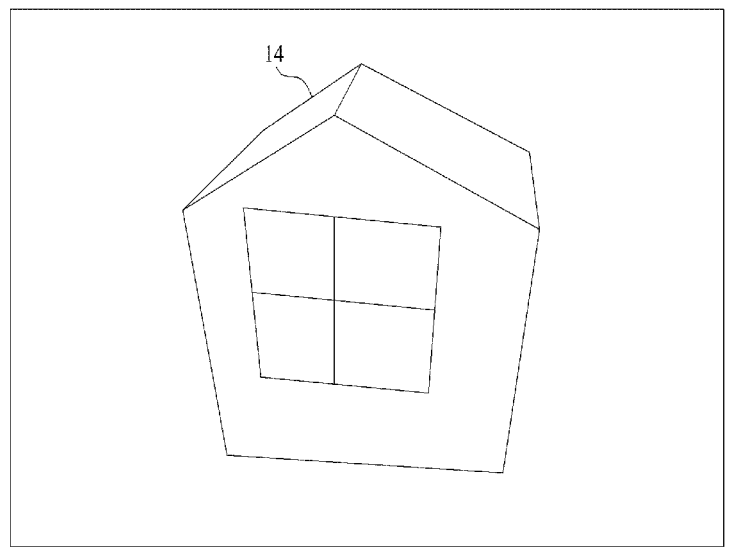
FIG. 7 illustrates a general view of an exemplary right-eye view image.

For example, in accordance with the set up value of the right-eye view, r and l values within the basic projection matrix of FIG. 3 are equally increased, so as to obtain a right-eye view projection matrix for generating right-eye view data. By using the right-eye view projection matrix, which is generated as described above, the 3D image data may be converted to the right-eye view image data. FIG. 7 illustrates a general view of an exemplary right-eye view image (14), which is generated in accordance with the right-eye view image data being converted by the right-eye view projection matrix. As shown in FIG. 7, an asymmetric image corresponding to the right-eye view of the user (16) may be generated by the right-eye view projection matrix.

Figure 8:
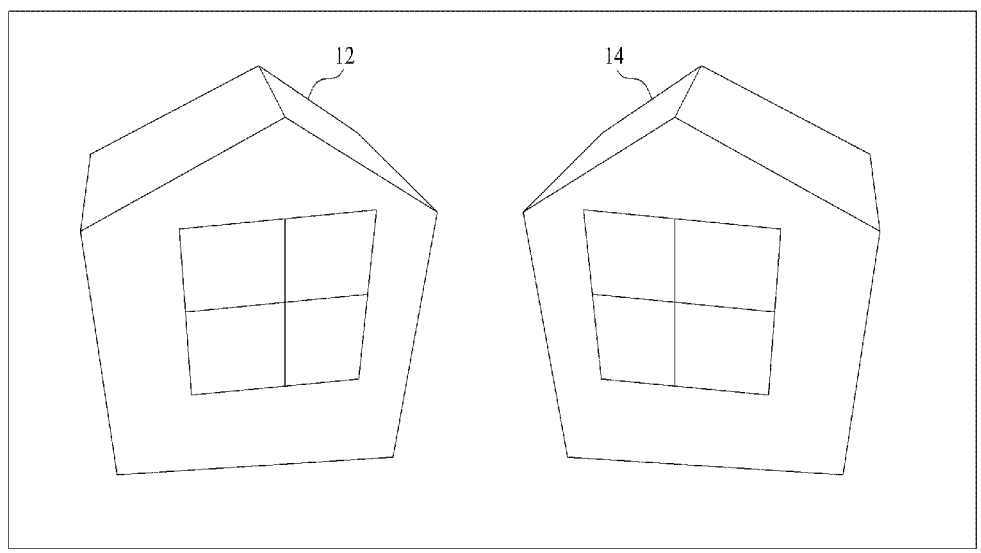
FIG. 8 illustrates a general view showing an example of generating a binocular parallax image by combining a left-eye view image and a right-eye view image.
Figure 9:
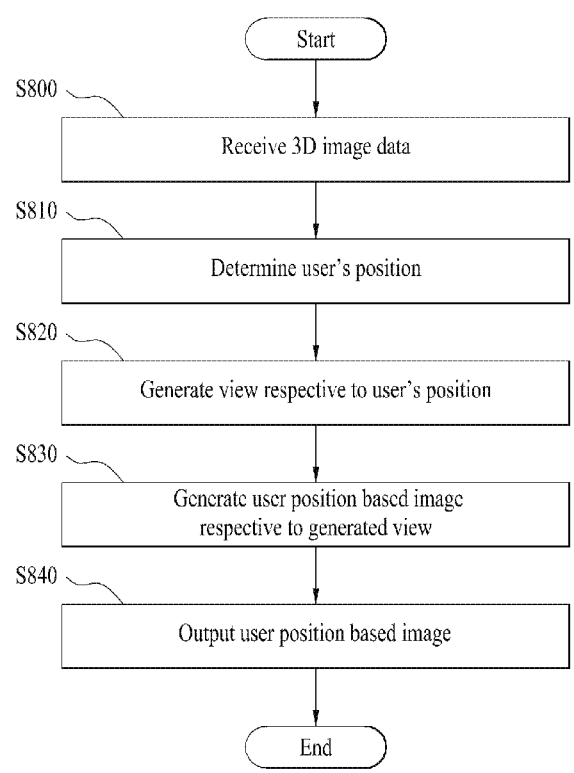
FIG. 9 illustrates a flow chart showing a method of displaying an image according to a second exemplary embodiment of the present invention.

Thereafter, the binocular parallax image is generated by combining the left-eye view image (12) and the right-eye view image (14) (S650). FIG. 8 illustrates a general view showing an example of generating a binocular parallax image. At this point, by combining the left-eye view image (12) and the right-eye view image (14), a binocular parallax image for an object polarizing method, a time-division (or time-sharing) method, a lenticular method, or a barrier method may be generated, and the present invention will not be limited only to a specific stereoscopic image realization method.

Subsequently, the generated binocular parallax image is outputted by using the display panel (160) (S700).

By performing the above-described method for displaying an image according to the first exemplary embodiment of the present invention, a binocular parallax image may be provided by using the 3D image data, which are provided from an application. At this point, even when the application does not provide the binocular parallax image, in accordance with the user's choice, the user (16) may be capable of viewing (or enjoying) a stereoscopic image having a sense of depth caused by the binocular parallax.

Additionally, since the left-eye view and the right-eye view may be set up based upon the characteristics of the device, such as the screen size of the display panel (160), the maximum allowable parallax, and so on, a binocular parallax image optimized to the image display device (100) may be provided.

Hereinafter, a method for displaying an image including a method for processing an image according to a second exemplary embodiment of the present invention will be described in detail with reference to FIG. 9 to FIG. 16. In this embodiment of the present invention, by detecting a position of the user (16) and by converting 3D image data based upon the detected user position, a method for outputting an image based upon the user (16) position may be provided. FIG. 8 illustrates a flow chart showing the method for displaying an image according to the second exemplary embodiment of the present invention.

First of all, 3D image data are received from an application (S800). At this point, the application providing the 3D image data, which include coordinate information within a 3D space, may correspond to an application based upon an openGL (Open Graphics Library).

Thereafter, the position of the user (16) is determined (S810). At this point, in order to determine the position of the user (16), the image display device (100) may be equipped with an image sensor or an optical sensor (104), and the position information of the user (16) may be detected from any one of an output of the image sensor and the output of the optical sensor (104), which detects light rays of a specific wave.

Figure 10:
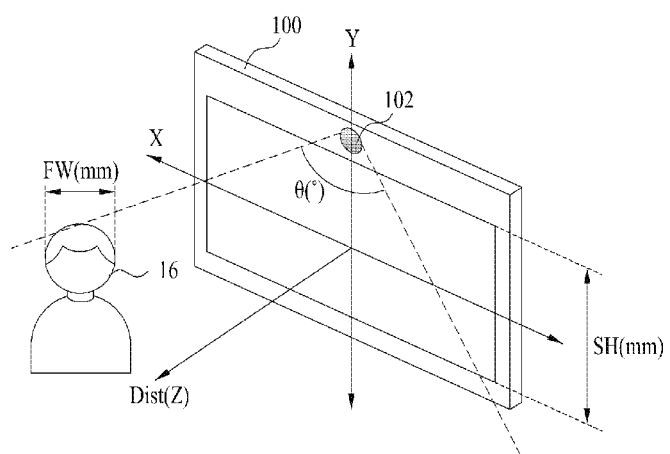
FIG. 10 illustrates a general view showing position information of a user's face from the image display device having a camera installed therein.

Hereinafter, a method for determining the user (16) position by using a camera (102) being equipped with an image sensor will be described in detail. FIG. 10 illustrates a general view showing position information of a user's (16) face from the image display device (100) having a camera (102) installed therein, and FIG. 11 illustrates a general view showing an image (18) of the user taken (or recorded) by the camera (102) of FIG. 10.

The image display device (100) includes a camera (102), which is installed in a frame. When the user (16) exists (or is positioned) within a view angle of the camera (102), an image (18) of the user is included in an image, which is recorded (or taken or captured) by the camera (102). The camera captured image, as shown in FIG. 11, includes a CW(px)×CH(px) pixel matrix, which is decided in accordance with a resolution of the camera (102).

Figure 11:
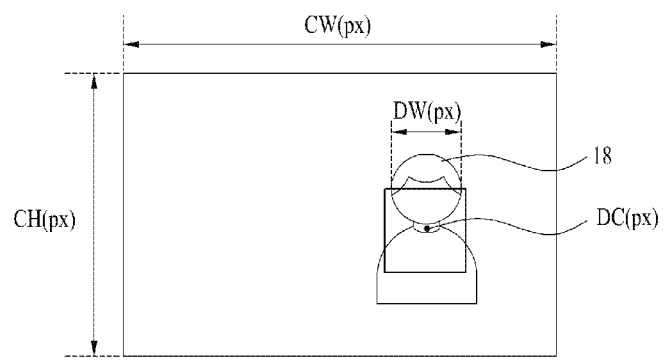
FIG. 11 illustrates a general view showing an image of the user taken (or recorded) by the camera of FIG. 10.

In this embodiment of the present invention, the camera captured image of the current frame, as shown in FIG. 11, may be analyzed, so as to determine whether or not position information of the user (16), which was calculated in a previous frame, exists. At this point, if the position information of the user (16) calculated in the previous frame exists, a search range of the user's (16) face may be set up (or determined) to the surroundings of the user (16) position, which was calculated in the previous frame. Conversely, if the position information of the user (16) calculated in the previous frame does not exist, the search range of the user's (16) face may be set up (or determined) to full range of the camera captured image of the current frame.

At this point, by searching for the user's (16) face using the disclosed face search algorithm within the predetermined face search range, the user's (16) face may be extracted from the camera captured image by using XYZ 3D position information (Face X, Face Y, Dist). As an exemplary face search algorithm, "Face Search Algorithm of Viola & Jones" may be applied, yet the present invention will not be limited only to this, and, therefore, any other disclosed face search algorithm may be applied herein. The face search algorithm of Viola & Jones is as shown below in Equations 1 to 4. And, in Equations 1 to 4, parameters FW(mm), SH(mm), 0(°), CW(px), and CH(px) respectively correspond to constant values each being decided by the image display device (100), the camera (102), and the camera captured image, as shown in FIG. 3 and FIG. 4, and DW(px) and DC(px), which are calculated from the camera captured image, respectively correspond to variable values each being calculated in real-time by the face search algorithm of Viola & Jones in accordance with the movement of the user (16). FW signifies a Face Width of the user (16), SH represents a Screen Height of the image display device (100), θ signifies an angle at which the user (16) views the stereoscopic image (or 3D image), CW represents a horizontal length of the camera captured image, CH signifies a vertical length of the camera captured image, DW represents a Detected Width of the user's (16) face detected from the camera captured image, and DC signifies a Detected Center of the user's (16) face detected from the camera captured image.

$$RPP = \frac{\pi}{360} \cdot \theta \cdot CW \qquad \text{Equation 1}$$

Herein, RPP corresponds to "Radians per pixel", and CW corresponds to the horizontal length of the camera captured image.

$$Dist = \frac{\left(\frac{FW}{2}\right)}{\tan\left(RPP \cdot \frac{DW}{2}\right)} \qquad \text{Equation 2}$$

Herein, Dist corresponds to a Face Distance between the user (16) and the image display device (100) shown in FIG. 3.

$$FaceX = \sin\left(RPP\left(DC.X - \frac{CW}{2}\right)\right) \cdot Dist \qquad \text{Equation 3}$$

Herein, FaceX corresponds to the position of the user's (16) face within the X-axis of FIG. 10, and DC.X corresponds to an X-axis pixel position of the detected center of the user's (16) face, which is detected from the camera captured image.

$$FaceY = \sin\left(RPP\left(DC.Y - \frac{CH}{2}\right)\right) \cdot Dist - \frac{SH}{2} \qquad \text{Equation 4}$$

Herein, FaceY corresponds to the position of the user's (16) face within the Y-axis of FIG. 10, and DC.Y corresponds to a Y-axis pixel position of the detected center of the user's (16) face, which is detected from the camera captured image.

If the user's (16) face fails to be detected from the camera captured image, an area of the camera captured image most including the skin color (or skin tone) is recognized as the user's (16) face, and, then, the user's (16) face may be extracted by using XYZ 3D position information (Face X, Face Y, Dist).

The above-described process is repeated for a predetermined period of time, e.g., for a period of several tens of frames, and an average value of the extracted 3D position information (Face X, Face Y, Dist) of the user's (16) face facing into the image display device (100) may be obtained. Even if the user (16) stays immobile and does not move at all, since the position information of the user (16) may slightly vary due to even the finest noise inserted in the position information (Face X, Face Y, Dist). Therefore, the above-described process is performed in order to smooth the position information of the user (16) along the time axis, so as to decide the average value as the final 3D position information of the user's (16) face.

Figure 12:
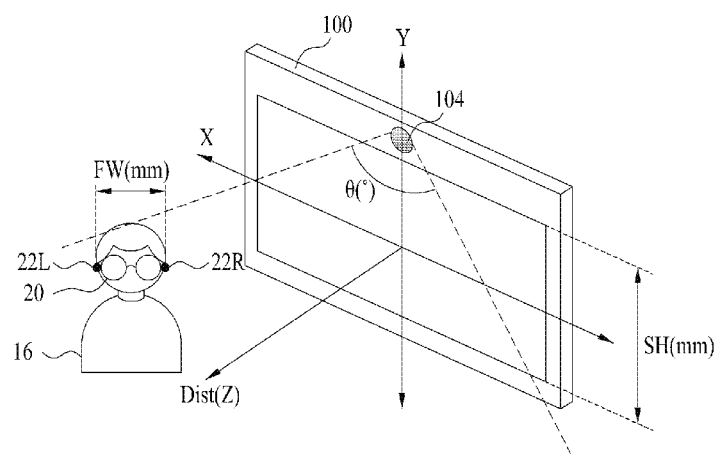
FIG. 12 illustrates a general view showing position information of a user's face from the image display device having an infrared light sensor installed therein.
Figure 13:
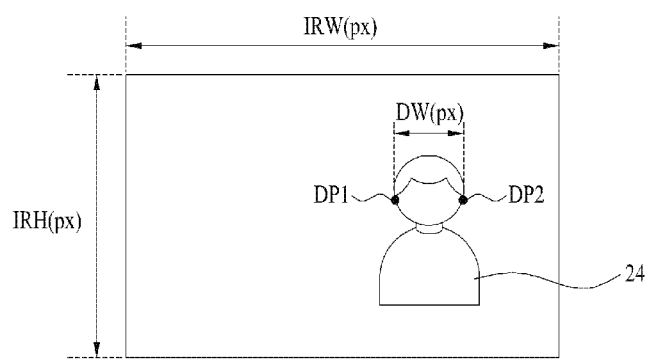
FIG. 13 illustrates a general view showing an image of the user detected by the infrared light sensor of FIG. 12.

Hereinafter, a method for determining the user (16) position by using an output of an optical sensor (104) being equipped with an image sensor will be described in detail. FIG. 12 illustrates a general view showing position information of a user's (16) face from the image display device (100) having an optical sensor (104) installed therein, and FIG. 13 illustrates a general view showing an image (24) of the user detected by the optical sensor (104) of FIG. 12. At this point, for example, the optical sensor (104) may correspond to an infrared light sensor.

Referring to FIG. 12 and FIG. 13, the image display device (100) includes an optical sensor (104), which is installed in its frame. The user (16) puts on (or wears) a pair of 3D polarized glasses (20) being equipped with left/right infrared light emitting devices (22L, 22R). After putting on the 3D polarized glasses (20), when the user (16) exists (or is positioned) within the view angle of the optical sensor (104), infrared light rays transmitted from each of the left/right infrared light emitting devices (22L, 22R) are received (or intercepted) from the output of the optical sensor (104). As shown in FIG. 13, the optical sensor (104) includes an IRW(px)×IRH(px) sensor matrix, which is decided in accordance with a sensor resolution.

Infrared light ray reception positions (DP1, DP2) are detected from the output of the optical sensor (104), as shown in FIG. 13, and by using Equations 5 to 11 shown below, the width of the user's (16) face (DW), center point XY coordinates of the user's (16) face (DC.X, DC.Y), and 3D position information (Face X, Face Y, Dist) of the user's (16) face are calculated.

$$DW = \sqrt{(DP1.X - DP2.X)^2 + (DP1.Y - DP2.Y)^2} \qquad \text{Equation 5}$$

Herein, DW corresponds to a width of a distance between left/right infrared light emitting devices (22L, 22R) detected from the optical sensor (104).

$$DC.X = \frac{DP1.X + DP2.X}{2} \qquad \text{Equation 6}$$

Herein, DC.X corresponds to a coordinate value of the center point of the user's (16) face within the X-axis.

$$DC.Y = \frac{DP1.Y + DP2.Y}{2} \qquad \text{Equation 7}$$

Herein, DC.Y corresponds to a coordinate value of the center point of the user's (16) face within the Y-axis.

$$RPP_{IR} = \frac{\pi}{360} \cdot \theta \cdot IRW \qquad \text{Equation 8}$$

Herein, RPPIR corresponds to "Radians per pixel", and IRW corresponds to a horizontal length of the output of the optical sensor (104).

$$Dist = \frac{\left(\frac{FW}{2}\right)}{\tan\left(RPP_{IR} \cdot \frac{DW}{2}\right)} \qquad \text{Equation 9}$$

Herein, Dist corresponds to a Face Distance between the user (16) and the image display device (100) shown in FIG. 12.

$$FaceX = \sin\left(RPP_{IR}\left(DC.X - \frac{IRW}{2}\right)\right) \cdot Dist \qquad \text{Equation 10}$$

Herein, FaceX corresponds to the position of the user's (16) face within the X-axis of FIG. 12, and DC.X corresponds to an x-axis coordinate value of the detected center of the user's (16) face, which is detected from the infrared light ray output.

$$FaceY = \sin\left(RPP_{IR}\left(DC.Y - \frac{IRH}{2}\right)\right) \cdot Dist - \frac{SH}{2} \qquad \text{Equation 11}$$

Herein, FaceY corresponds to the position of the user's (16) face within the Y-axis of FIG. 12, and DC.Y corresponds to a Y-axis coordinate value of the detected center of the user's (16) face, which is detected from the camera captured image. IRW corresponds to a vertical height of the output of the optical sensor (104), and SH corresponds to vertical Screen Height within the display screen of the image display device (100).

Thereafter, a viewpoint (or view) respective to the position of the user (16) is generated (S820). At this point, as described above, the viewpoint is set up by using the calculated 3D position information of the user (16). For example, in the basic projection matrix of FIG. 3, by increasing or decreasing r, l, t, b, n, and f values with respect to the calculated 3D position information of the user (16), the viewpoint respective to the user's (16) position may be generated. Additionally, at this point, the viewpoint may be varied in real-time with respect to the 3D position information of the user's (16) face.

Subsequently, a user position based image is generated by modifying the 3D image data in accordance with the generated viewpoint (or view) (S830), and, then, the generated user position based image is outputted (S840). At this point, the 3D image data may be modified based upon the generated view, so as to generate the user position based image data, and, then, by rendering the user position based image data, the user position based image may be generated.

Figure 14:
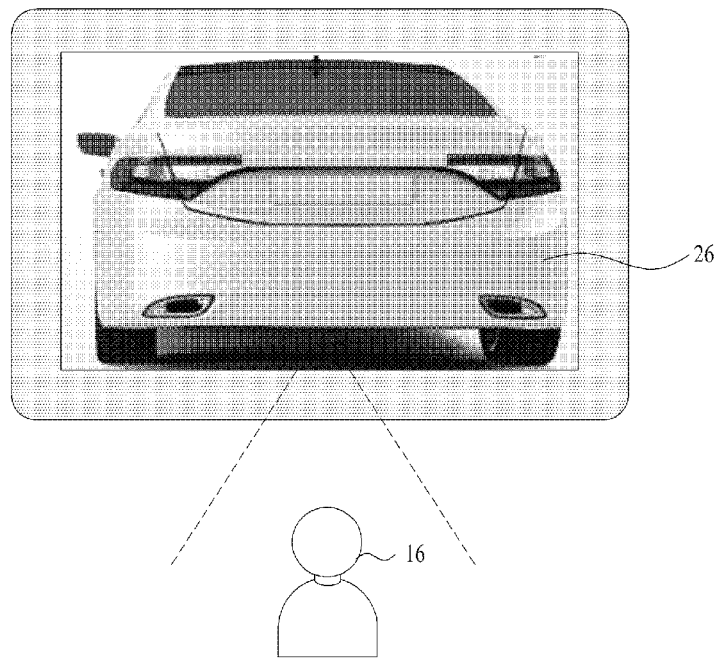
FIG. 14 illustrates an exemplary image being displayed when the user is positioned in front.
Figure 15:
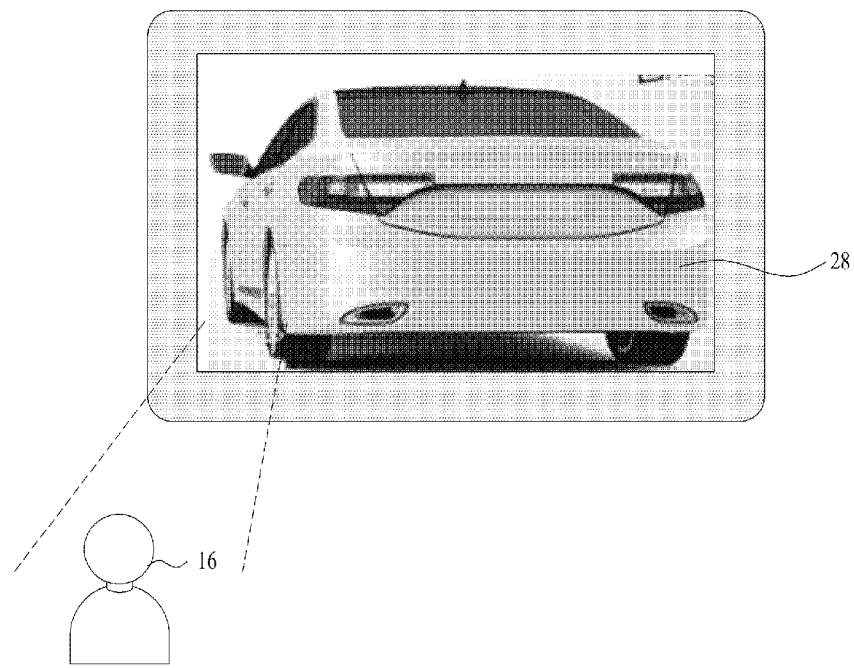
FIG. 15 illustrates an exemplary image being displayed when the user is positioned on the left side.
Figure 16:
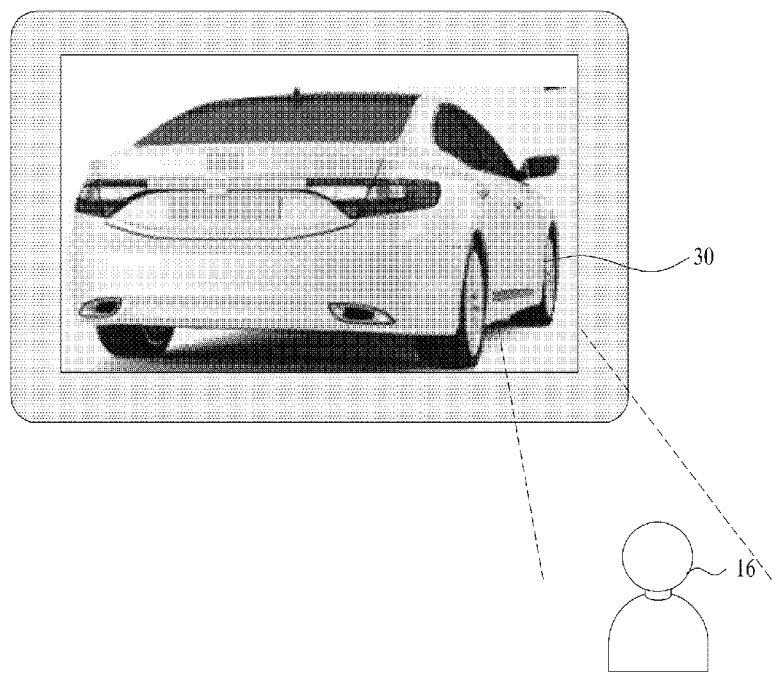
FIG. 16 illustrates an exemplary image being displayed when the user is positioned on the right side.

FIG. 14 illustrates a general view of an exemplary image (26) being displayed when the user (16) is positioned in front, FIG. 15 illustrates a general view of an exemplary image (28) being displayed when the user (16) is positioned on the left side, and FIG. 16 illustrates a general view of an exemplary image (30) being displayed when the user (16) is positioned on the right side.

As shown in FIG. 14, when the user (16) is positioned in front of the display screen, for example, user position based image data are generated by using the basic projection matrix of FIG. 3, and by rendering the generated user position based image data, a user (16) position based image (26) may be generated and outputted.

Additionally, as shown in FIG. 15, when the user (16) is positioned on the left side of the display screen, for example, r and l values within the basic projection matrix of FIG. 3 may be equally decreased with respect to the position information of the user (16), so as to obtain a user position based projection matrix. Then, by using the user position based projection matrix, which is generated as described above, the 3D image data may be converted to user position based image data.

Furthermore, as shown in FIG. 16, when the user (16) is positioned on the right side of the display screen, for example, r and l values within the basic projection matrix of FIG. 3 may be equally increased with respect to the position information of the user (16), so as to obtain a user position based projection matrix. Then, by using the user position based projection matrix, which is generated as described above, the 3D image data may be converted to user position based image data.

According to the above-described image display method according to the second exemplary embodiment of the present invention, by detecting the user's (16) view in real-time, a user position based image respective to the detected user's (16) view may be outputted. Accordingly, even in case of using a 2D image display device, which does not provide a stereoscopic image (or 3D image), the user (16) may be capable of viewing (or enjoying) an image having a 3D effect.

An image display device (100) including an image processing device according to an exemplary embodiment of the present invention will hereinafter be described in detail with reference to FIG. 17. The image display device (100) according to the exemplary embodiment of the present invention is configured to realize the above-described image display method according to the first and second exemplary embodiments of the present invention. Herein, the image display device (100) may include all types of display devices, such as digital televisions, a PC monitor, mobile phones, and so on.

Figure 17:
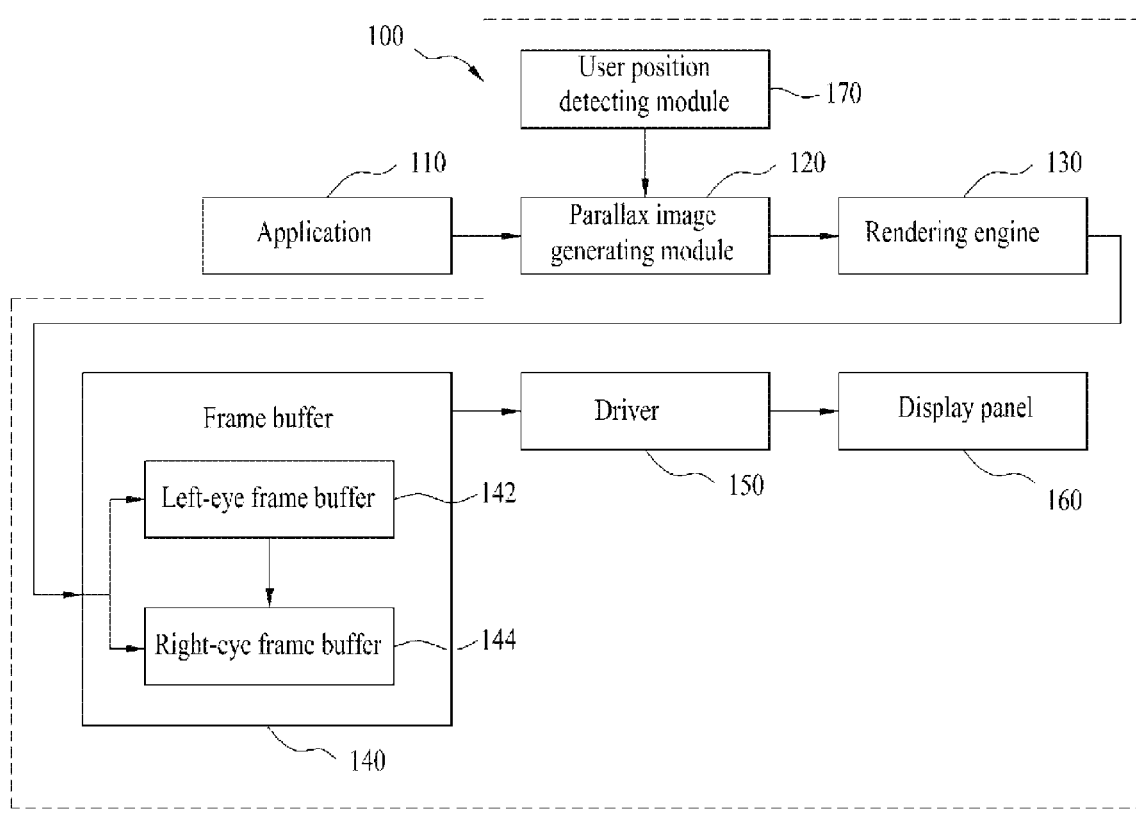
FIG. 17 illustrates a general view of an image display device according to an exemplary embodiment of the present invention.

FIG. 17 illustrates a general view of an image display device (100) according to the exemplary embodiment of the preset invention. As shown in FIG. 17, the image display device (100) according to the exemplary embodiment of the preset invention includes a parallax image generating module (120), a rendering engine (130), a frame buffer (140), a driver (150), a display panel (160), and a user position detecting module (170).

The parallax image generating module (120) receives 3D image data from an application (110), generates a left-eye view respective to the user's (16) left eye and a right-eye view respective to the user's (16) right eye, generates left-eye view image data by modifying the 3D image data based upon the left-eye view, and generates right-eye view image data by modifying the 3D image data based upon the right-eye view.

Additionally, the parallax image generating module (120) receives 3D image data from the application (110), generates a view (or view point) respective to a position of the user (16), which is detected by the user position detecting module (170), and generates user position based image data by modifying the 3D image data in accordance with the generated view.

The rendering engine (130) generates a left-eye view image by rendering left-eye view image data and generates a right-eye view image by rendering right-eye view image data.

Additionally, the rendering engine (130) generates a user position based image by rendering the user position based image data, which are generated from the parallax image generating module (120).

The frame buffer (140) temporarily stores an image that is to be displayed on the display panel (160). The frame buffer (140) may include a left-eye frame buffer (142), which stores the left-eye view image generated from the rendering engine (130) and outputs the stored image to the driver (150), and a right-eye frame buffer (144), which stores the right-eye view image generated from the rendering engine (130) and outputs the stored image to the driver (150).

The driver (150) generates a binocular parallax image by combining the left-eye view image and the right-eye view image.

The display panel (160) outputs the binocular parallax image or the user position based image.

The user position detecting module (170) determines the position of the user (16). The user position detecting module (170) may include at least one of an image sensor and an optical sensor (104), which detects light rays of a specific wave. The user position detecting module (170) may calculate 3D position information of the user's (16) face from any one of an output of the image sensor and an output of the optical sensor (104), so as to detect position information of the user (16).

Each element (or component) of the above-described image display device (100) according to the exemplary embodiment of the present invention are merely exemplary, and, therefore, each element may be configured to be integrated with one another or to be additionally divided (or separated) from one another.

Additionally, each elements may be configured in the form of hardware, software, or a combination of both performing the above-described functions. And, therefore, the present invention will not be limited only to this.

Hereinafter, operations of the image display device (100), which is configured as described above, will be described in detail. First of all, an example of the above-described image display method according to the first exemplary embodiment of the present invention being provided by the image display device (100) according to the exemplary embodiment of the present invention will hereinafter be described in detail.

The parallax image generating module (120) receives 3D image data being provided from an application (110). At this point, the application (110) providing the 3D image data, which include coordinate information within a 3D space, may correspond to an application (110) based upon an openGL (Open Graphics Library).

Additionally, the parallax image generating module (120) determines whether or not the 3D image data, which are outputted from the application (110), are to be converted to a binocular parallax image. At this point, in case the image output mode corresponds to a general 2D image output mode instead of the binocular parallax image, the parallax image generating module (120) generates an image respect to a single view and outputs the image being generated with respect to the single view.

Meanwhile, in case the image output mode corresponds to a binocular parallax image output mode, the parallax image generating module (120) sets up (or determines) a left-eye view corresponding to the left eye and a right-eye view corresponding to the right eye of the user (16).

At this point, the parallax image generating module (120) may equally decrease or increase r and l values of the basic projection matrix of FIG. 3, so as to set up (or determine) the left-eye view and the right-eye view. At this point, in the exemplary space shown in FIG. 2, the parallax image generating module (120) may set up the left-eye view and the right-eye view based upon the characteristics, such as the positions of the objects, the width of a far plain, the size of the display screen, and measurement values of the maximum allowable parallax.

For example, in case multiple objects are concentrated in a limited space, the user (16) may have difficulty in experiencing the sense of depth. Therefore, by scaling a distance between the left-eye view and the right-eye view with respect to the position of the corresponding object, the sense of depth may be optimized.

At this point, as an average position of the objects are located closer to the far plain along the z axis, it is preferable that the distance between the left-eye view and the right-eye view are increased at a constant rate.

Additionally, since the parallax has the greatest value in the far plain, the distance between the left-eye view and the right-eye view may be adjusted so that the maximum allowable parallax can be gained herein.

Furthermore, when performing a rendering process on a final screen, since the far plain is scaled to best fit the screen size of a display panel (160), by calculating a ratio between the width of the far plain and the screen size, the distance between the left-eye view and the right-eye view may be adjusted so that a final shift value can be within the range of the maximum allowable parallax. At this point, the maximum allowable parallax corresponds to a value that is calculated by assuming a predetermined distance from the image display device (100), wherein the maximum allowable parallax value may be decided in pixel units.

Additionally, the parallax image generating module (120) modifies the 3D image data based upon the left-eye view, so as to generate left-eye view image data and outputs the generated data to the rendering engine (130). The rendering engine (130) then renders the left-eye view image data, so as to generate a left-eye view image in the left-eye frame buffer (142).

For example, in accordance with the set up value of the left-eye view, the parallax image generating module (120) may equally decrease r and l values within the basic projection matrix of FIG. 3, so as to obtain a left-eye view projection matrix for generating left-eye view data. Additionally, by using the left-eye view projection matrix, which is generated as described above, the parallax image generating module (120) may convert the 3D image data to the left-eye view image data. As shown in FIG. 6, an asymmetric image corresponding to the left-eye view of the user (16) may be generated by the left-eye view projection matrix.

Furthermore, the parallax image generating module (120) modifies the 3D image data based upon the right-eye view, so as to generate right-eye view image data and outputs the generated data to the rendering engine (130). The rendering engine (130) then renders the right-eye view image data, so as to generate a right-eye view image in the right-eye frame buffer (144).

For example, in accordance with the set up value of the right-eye view, the parallax image generating module (120) may equally increase r and l values within the basic projection matrix of FIG. 3, so as to obtain a right-eye view projection matrix for generating right-eye view data. Additionally, by using the right-eye view projection matrix, which is generated as described above, the parallax image generating module (120) may convert the 3D image data to the right-eye view image data. As shown in FIG. 7, an asymmetric image corresponding to the right-eye view of the user (16) may be generated by the right-eye view projection matrix.

The driver (150) generates the binocular parallax image by combining the left-eye view image and the right-eye view image. At this point, the driver may generate a binocular parallax image for an object polarizing method, a time-division (or time-sharing) method, a lenticular method, or a barrier method by combining the left-eye view image and the right-eye view image, and the present invention will not be limited only to a specific stereoscopic image realization method.

The display panel (160) displays the generated binocular parallax image, which is outputted from the driver (150).

An example of the above-described image display method according to the second exemplary embodiment of the present invention being provided by the image display device (100) according to the exemplary embodiment of the present invention will hereinafter be described in detail.

The parallax image generating module (120) receives 3D image data from an application (110). At this point, the application (110) providing the 3D image data, which include coordinate information within a 3D space, may correspond to an application (110) based upon an openGL (Open Graphics Library).

The user position detecting module (170) determines the position of the user (16). At this point, in order to determine the position of the user (16), the user position detecting module (170) may be equipped with an image sensor or an optical sensor (104), and the position information of the user (16) may be detected from any one of an output of the image sensor and the output of the optical sensor (104), which detects light rays of a specific wave. Since the method for detecting the user's (16) position has already been described above in detail in the image display method according to the second exemplary embodiment of the present invention, detailed description of the same will be omitted for simplicity.

The parallax image generating module (120) generates a viewpoint (or view) respective to the position of the user (16), which is provided from the user position detecting module (170). At this point, for example, in the basic projection matrix of FIG. 3, the parallax image generating module (120) increases or decreases r, l, t, b, n, and f values with respect to the calculated 3D position information of the user (16), so as to generate the viewpoint (or view) respective to the user's (16) position. Additionally, at this point, the parallax image generating module (120) may vary the viewpoint (or view) in real-time with respect to the 3D position information of the user's (16) face.

The parallax image generating module (120) may modify the 3D image data in accordance with the generated viewpoint (or view), so as to generate a user position based image, and, the parallax image generating module (120) may then output the generated user position based image to the rendering engine (130). The rendering engine (130) generates the user position based image to the frame buffer (140) by using the user position based image data.

At this point, the parallax image generating module (120) may modify the 3D image data based upon the generated view, so as to generate the user position based image data, and, then, the rendering engine (130) may generate the user position based image by rendering the user position based image data.

As shown in FIG. 14, when the user (16) is positioned in front of the display screen, for example, the parallax image generating module (120) may generate user position based image data are generated by using the basic projection matrix of FIG. 3.

Additionally, as shown in FIG. 15, when the user (16) is positioned on the left side of the display screen, for example, the parallax image generating module (120) may equally decrease r and l values within the basic projection matrix of FIG. 3 with respect to the position information of the user (16), so as to obtain a user position based projection matrix. Then, by using the user position based projection matrix, which is generated as described above, the parallax image generating module (120) may convert the 3D image data to user position based image data.

Furthermore, as shown in FIG. 16, when the user (16) is positioned on the right side of the display screen, for example, the parallax image generating module (120) may equally increase r and l values within the basic projection matrix of FIG. 3 with respect to the position information of the user (16), so as to obtain a user position based projection matrix. Then, by using the user position based projection matrix, which is generated as described above, the parallax image generating module (120) may convert the 3D image data to user position based image data.

Although the present invention has been described above in accordance with the preferred embodiments of the present invention, it will be apparent that the present invention will not be limited only to this and that various modifications and variations can be made in the present invention without departing from the spirit or scope of the inventions and the scope of the detailed description of the present invention and the appended drawings of the present invention. It is also apparent that such variations of the present invention do not depart from the technical scope or spirit of the present invention.

What is claimed is:

1. An image processing method performed by a processor of an image processing device, the method comprising:
    causing a parallax image generating module to receive a three-dimensional (3D) image data from an application layer;
    causing a user position detection module to generate a 3D coordination of a user's face in response to detection of the user's face;
    causing the parallax image generating module to generate a left projection matrix corresponding to a left-eye view and a right projection matrix corresponding to a right eye view; and
    causing a rendering engine to generate a left-eye view image based on the left projection matrix and a right-eye view image based on the right projection matrix; and
    causing a driver to generate a binocular parallax image by combining the left-eye view image and the right-eye view image,
    wherein values of elements in the left projection matrix and the right projection matrix for generating the left-eve view image and the right-eve view image are adjusted according to the 3D coordination of the user's face.

2. The method of claim 1, wherein:
    the left-eye view image is generated by rendering a left-eye view image data which is generated by modifying the 3D image data based on the left projection matrix; and,
    the right-eye view image is generated by rendering a right-eye view image data which is generated by modifying the 3D image data based on the right projection matrix.

3. The method of claim 1, wherein the 3D image data corresponds to Open Graphics Library (openGL) based data.

4. The method of claim 1, wherein the left projection matrix and the right projection matrix are adjusted in accordance with characteristics of an image display device displaying the binocular parallax image.

5. The method of claim 4, wherein the characteristics include a screen size of the image display device.

6. The method of claim 1, further comprising calculating the 3D coordination of the user's face by averaging 3D location information of the user's face in a plurality of consecutive frames in response to detection of the user's face by a camera.

7. The method of claim 1, further comprising calculating the 3D coordination of the user's face based on light ray reception positions of an optical sensor in response to detection of the user's face by the optical sensor.

8. An image processing device, comprising:
    a camera or an optical sensor configured to detect a user's face; and
    a processor configured to:
        cause a user position detecting module to generate a three-dimensional (3D) coordination of the user's face;
        cause a parallax image generating module to receive a three-dimensional (3D) image data from an application layer;
        cause the parallax image generating module to generate a left projection matrix corresponding to a left-eye view and a right projection matrix corresponding to a right eye view;

cause a rendering engine to generate a left-eye view image based on the left projection matrix and a right-eye view image based on the right projection matrix; and cause a driver to generate a binocular parallax image by combining the left-eye view image and the right-eye view image, wherein values of elements in the left projection matrix and the right projection matrix for generating the left-eye view image and the right-eye view image are adjusted according to the 3D coordination of the user's face.

9. The device of claim 8, wherein the processor is further configured to calculate the 3D coordination of the user's face by averaging 3D location information of the user's face in a plurality of consecutive frames.

10. The device of claim 8, wherein the processor is further configured to calculate the 3D coordination of the user's face based on light ray reception positions of the optical sensor.

11. The device of claim 8, wherein the application corresponds to an Open Graphics Library (openGL) application.

12. The device of claim 8, wherein the left projection matrix and the right projection matrix are adjusted in accordance with characteristics of an image display device displaying the binocular parallax image.

13. The device of claim 12, wherein the characteristics include a screen size of the image display device.

* * * * *